United States Patent [19]

Finlay

[11] Patent Number: 4,770,151

[45] Date of Patent: Sep. 13, 1988

[54] ANTI-POLLUTION ATTACHMENT FOR INTERNAL COMBUSTION ENGINES

[76] Inventor: Roy H. V. Finlay, P.O. Box 5802, Lighthouse Point, Fla. 33074

[21] Appl. No.: 103,110

[22] Filed: Sep. 30, 1987

Related U.S. Application Data

[63] Continuation-in-part of Ser. No. 924,209, Oct. 10, 1986.

[51] Int. Cl.[4] .......................................... F02M 29/00
[52] U.S. Cl. .................................... 123/590; 48/189.2
[58] Field of Search ............ 123/590; 48/189.2, 189.4, 48/593, 545

[56] References Cited

U.S. PATENT DOCUMENTS

| | | | |
|---|---|---|---|
| 1,703,493 | 2/1929 | Leach | 48/189.2 |
| 3,458,297 | 7/1969 | Anderson | 48/189.4 |

FOREIGN PATENT DOCUMENTS

| | | | |
|---|---|---|---|
| 503653 | 6/1920 | France | 123/545 |
| 788535 | 10/1935 | France | 123/545 |
| 197984 | 5/1923 | United Kingdom | 48/189.2 |

Primary Examiner—E. R. Cross
Attorney, Agent, or Firm—Malin, Haley & McHale

[57] ABSTRACT

An apparatus for improving the combustion in the engine cylinders and simultaneously reducing the pollutants in the exhaust gases from the engine and directs a portion thereof into a mixing chamber where it comes into intimate contact with air/fuel mixture to preheat the air/fuel mixture. The mixing chamber is provided with a centrally located stator vane assembly which imparts a swirling motion to the gases therein. The base of the stator vane assembly serves as a heat sink to conduct and transmit heat to the stator vanes since its upper and lower disk-like surfaces are exposed to the hot exhaust gases which have been recycled back into the engine.

6 Claims, 4 Drawing Sheets

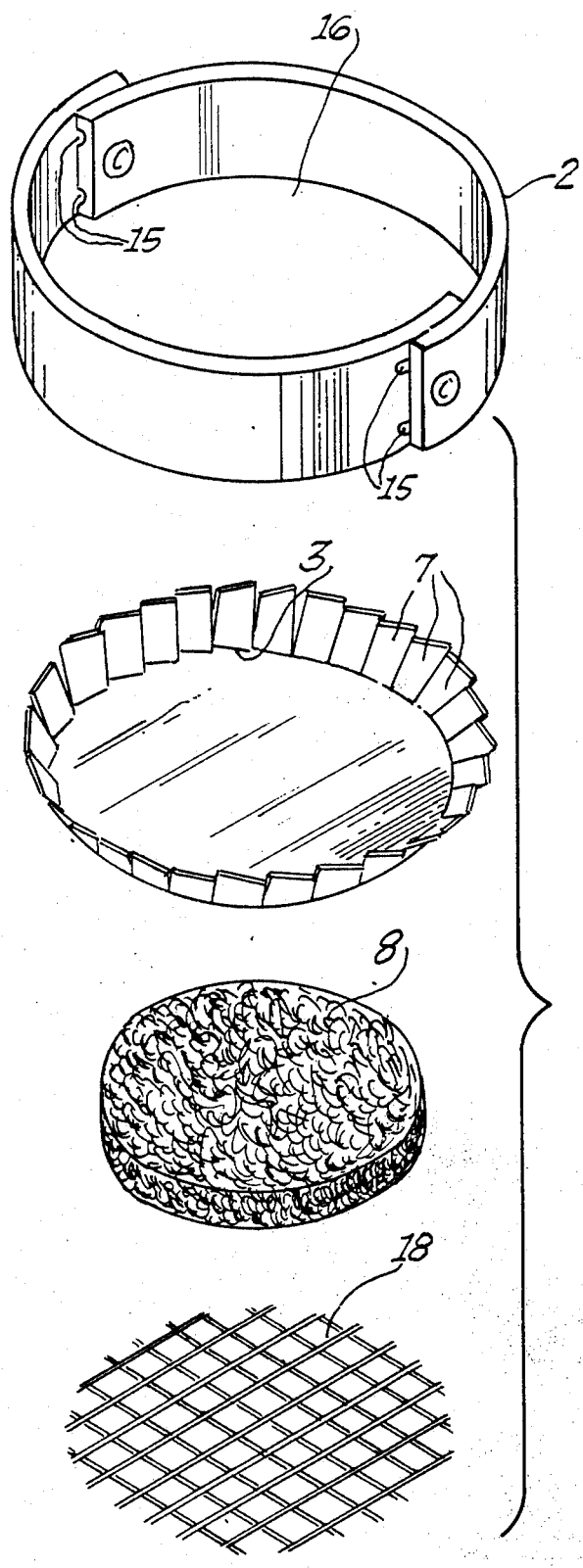
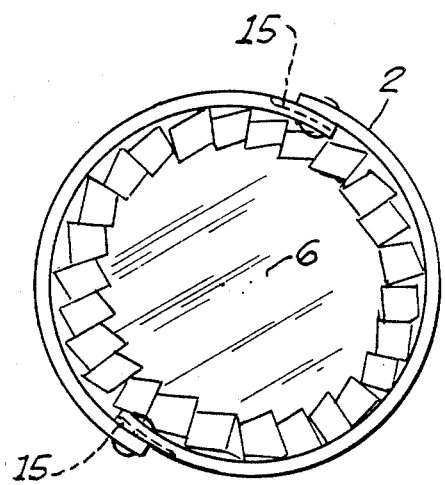
Fig.5.
Fig.4.

ANTI-POLLUTION ATTACHMENT FOR INTERNAL COMBUSTION ENGINES

This application is a continuation-in-part of Ser. No. 924,209, filed Oct. 10, 1986.

BACKGROUND OF THE INVENTION

During the past two decades there has been increased activity on the part of automotive engineers to find an economical and yet reliable way to improve the efficiency of automotive engines by increasing the mileage attainable (MPG) and simultaneously decreasing the amount of pollution emitted in the exhaust gases.

The most recent event that brought the world to its knees was the oil embargo of 1979. As a result of the oil embargo and the associated gasoline shortages, engineers and inventors throughout the world embarked on crash programs to find new sources of energy and also to find ways of improving or increasing the output attainable from the supplies that were available. In addition to the oil shortage problems, there has been a growing concern about the environment and the associated air pollution problems being experienced by all the metropolitan areas of the U.S.A. There are many sources of air pollution, however, studies have shown that the major portion of air pollution is caused by the exhaust gases released from autos.

With these two known facts in mind, a considerable amount of time and effort has been devoted toward the development of an apparatus which will improve the miles per gallon of fuel and simultaneously reduce the amount of pollutants such as nitrous oxide and especially carbon monoxide resulting in more carbon dioxide being released which is beneficial to plant and tree growth which in turn produces oxygen.

The present invention relates to a new and useful apparatus for increasing the mixing and blending of the fuel and air mixture received from the carburetor or fuel injector throttle body base before the mixture enters the combustion chambers of conventional internal combustion engines.

It is also an objective of the instant invention to provide an attachment that is simple to produce with ordinary hand tools for all sizes and types of engines. The attachment is very compact and easy to fit into the available space, retaining all the anti-pollution equipment required by law and also providing a flame suppressor to prevent fires in case of engine back-fire. This attachment may be retro-fitted or form part of the original equipment for reducing pollution and increasing engine efficiency and gasoline mileage.

Another object of the invention is to provide a mixer or blender which is capable of using fuels in addition to gasoline, such as hydrogen and oxygen, natural gas and oxygen, methane and oxygen, kerosene and oxygen, propane and oxygen or any other flammable gas or gasses or liguid fuel that would vaporize to form a flammable gas in the presence of oxygen or for blending in oxygen for improved combustion. Addition of heat by way of pre-heating the air/fuel mixture increases the rate of measuring the oxygen, hydrogen and carbon molecules for faster, cleaner combustion.

It is also an object of the invention to provide a means for pre-heating the air/fuel mixture by utilizing exhaust gases from the engine. Passages are provided to admit a portion of the exhaust gases into the mixing chamber returning the gases to further reduce the amount of pollutants in the exhaust, especially Nitrogen Oxide.

In accordance with these and other objects which will be apparent hereinafter, the instant invention will now be described with particular reference to the accompanying drawings.

BRIEF DESCRIPTION OF THE DRAWINGS

FIG. 4 is an exploded view illustrating the components contained within the outer sealing ring and between the upper and lower plates.

FIG. 5 is a showing of the heated ring with the stator assembly positioned therein.

DESCRIPTION OF THE PREFERRED EMBODIMENT

Figure 1:
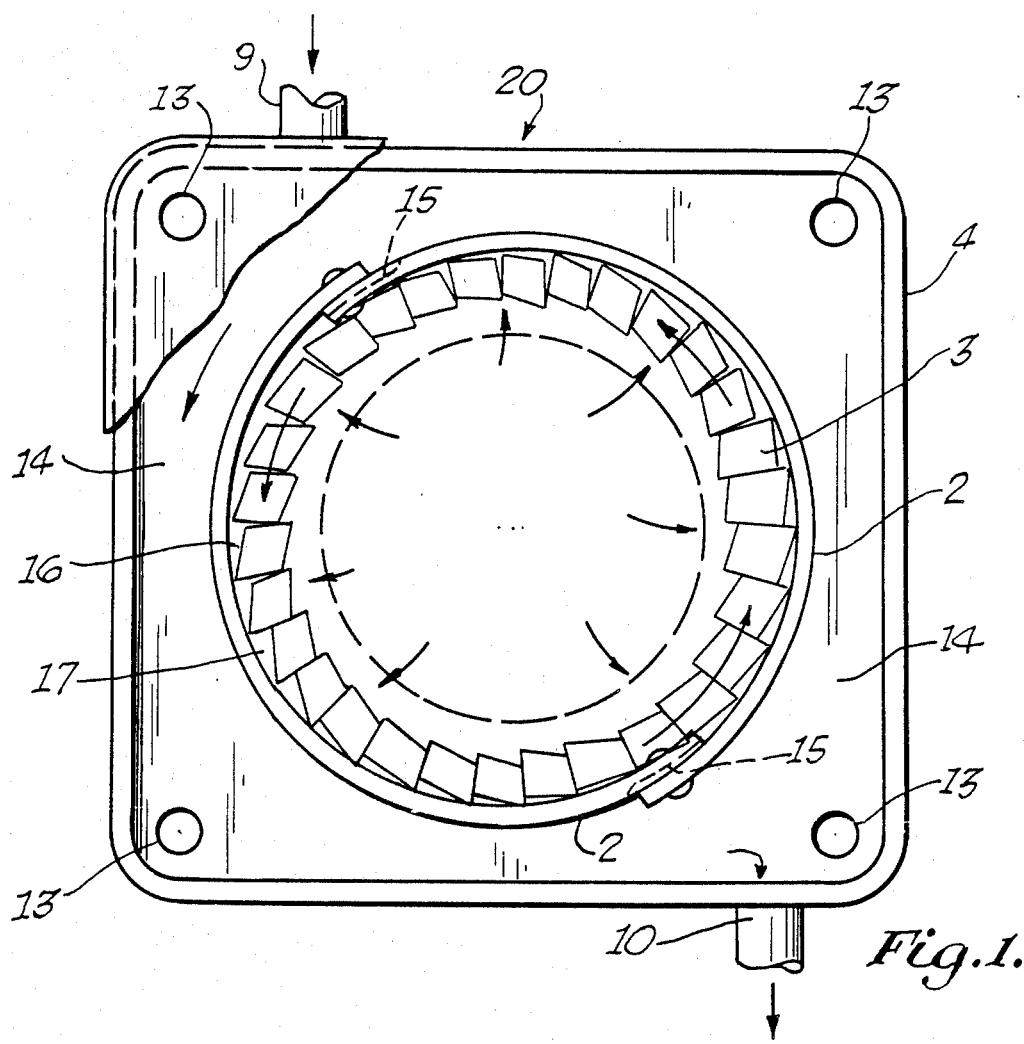
FIG. 1 is a plan view of the device with the upper plate removed.

Referring initally to FIG. 1, the apparatus of the invention is indicated generally at 20. The anti-pollution apparatus 20 is illustrated with its upper plate 11 removed to permit a viewing of the internal components. A generally rectangular outer wall 4 having an upper plate 11 (FIG. 2) and a lower plate 12 serve as the outer walls of the device when in its assembled state. The assembled unit with appropriate upper and lower gaskets 21 and 22 (FIG. 2) is adapted to be inserted between the carburetor and intake manifold of a conventional internal combustion engine. The upper and lower plates 11 and 12 are provided with appropriate bolt holes 13 which are aligned with the holes of the carburetor base and intake manifold (not shown). Fitted into walls of rectangular outer wall 4 is an exhaust gas inlet 9 and outlet 10.

Exhaust gases admitted through inlet 9 enter into the exhaust gas chamber 14 wherein the heat of the exhaust gases is transferred to inner wall 2 due to its peripheral contact with the hot gases. Although the outer surface of inner wall 2 is shown as smooth, it may be provided with grooves or ribs that extend circumferentially around the inner wall to provide additional surface area for hot gas contact resulting in improved heat transfer. Outlet port 10 is provided to permit a constant flow of exhaust gases passing through chamber 14. Inner wall 2 is provided with a plurality of angled ports 15 at two locations spaced approximately 180° apart. Ports 15 direct a portion of the exhaust gases into a mixing chamber 16 tangentially inward of inner wall 2. It is to be noted that mixing chamber 16 includes the area radially inward of inner wall 2 and between upper plate 11 and the base of stator vane assembly 6. It has been found through experimentation that the heat flow is greatly improved by the use of ports 15. By allowing hot gases to enter mixing chamber 16 more efficient vaporization of the fuel takes place in less time while the exhaust gases also helps to limit the maximum combustion temperatures possible in the cylinders of the engine and so reduces the formation of harmful and polluting nitrous oxides or oxides of nitrogen.

The angled ports 15 admit the gases tangentially to keep the hot gases in contact with stator blade assembly 3 and inner wall 2 to improve the centrifugal action imparted to the air and fuel mixture. Other ports or apertures may be provided in wall 2 and controlled by adjustable valves, such as needle valves to enable an adjustment of the idling mixture to effect a reasonably smooth idling of the engine. The stator blade wall assembly of mixing chamber 16 is formed of a thin strip of aluminum, copper, silver or other high heat conducting material that is grooved or finned as is usual in a rolling or extruding process.

Figure 2:
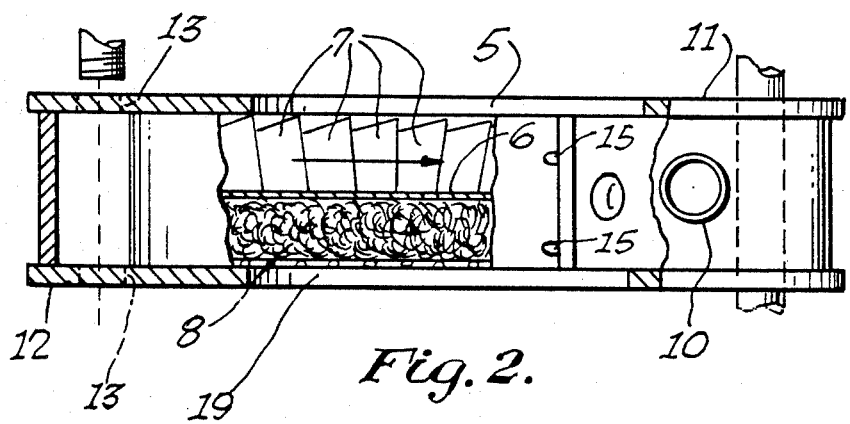
FIG. 2 is a sectional view taken along the plane 2—2 of FIG. 1 with upper plate 11 shown in place.
Figure 3:
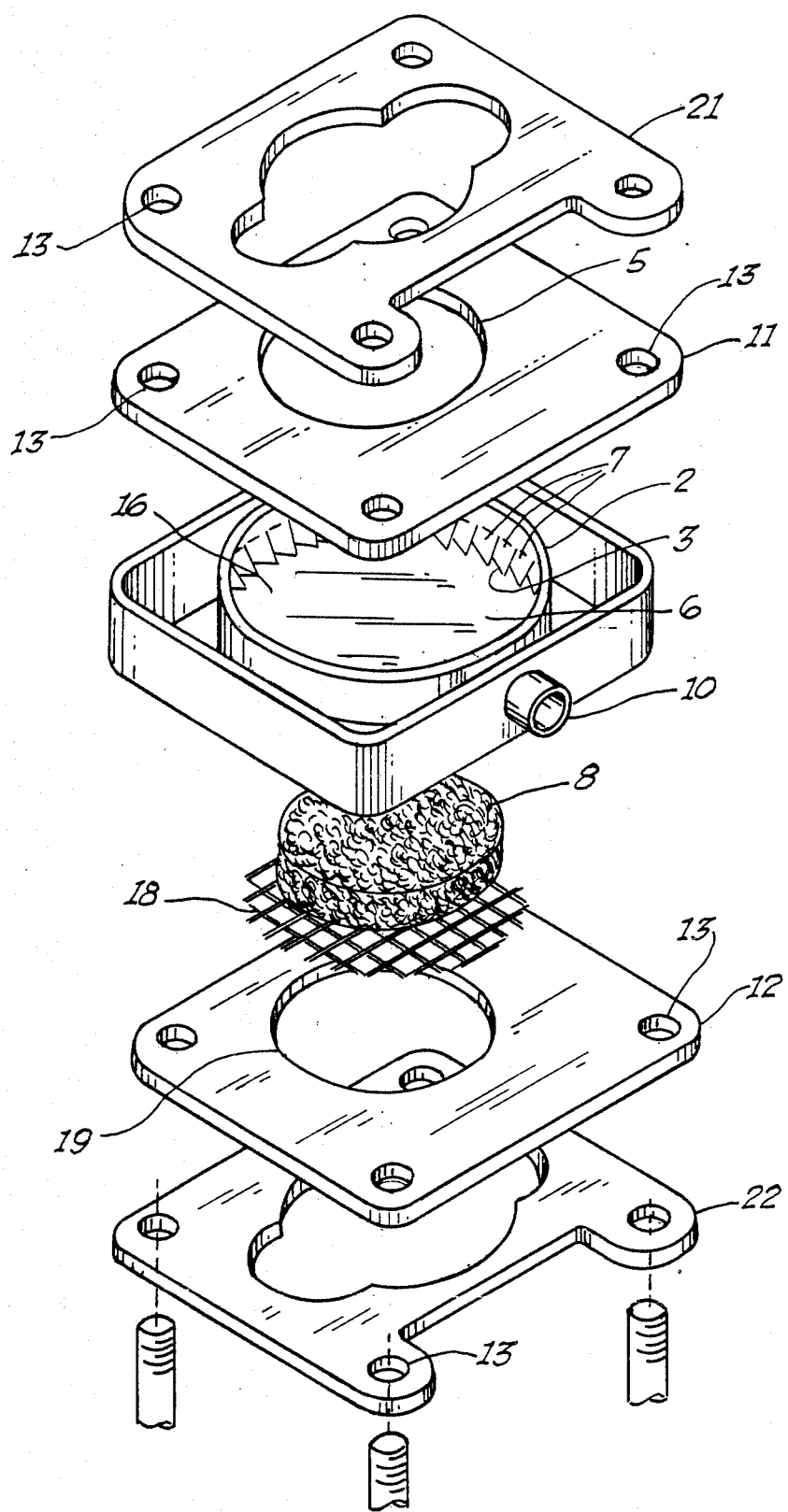
FIG. 3 is an exploded view of the device showing the relative position of each component.

As can be seen in FIG. 2, the air fuel mixture is received from the carburetor or throttle body base and enters bore 5 in upper plate 11, shown in FIG. 3. Bore 5 directs the fuel/air mixture into a mixing chamber 16 which contains stator blade assembly 3. Stator vane assembly 3 consists of a flat disc-like base 6 and a plurality of peripherally spaced vanes 7 which project upward therefrom. Although base 6 is shown as flat, it could be domed or conical with the peak of the cone or dome being located at its center. The main purpose in utilizing a peaked or domed stator vane assembly is to increase its surface area, thus transferring additional heat to the air/fuel mixture. Also, a domed or conical stator blade assembly would smoothen the flow lines of the incoming fuel/air mixture and make the transition from vertical to radial flow less abrupt for the air/fuel mixture entering mixing chamber 16. Stator vanes 7 are spaced from each other to permit exit of the air/fuel mixture which entered bore 5. After striking base 6, the mixture is forced out radially and tangentially between adjacent vanes as shown by the arrows. After passing through the spaces between adjacent vanes the air/fuel and exhaust gas mixture enters third chamber 17. It than flows beneath base 6 of stator vane assembly 3 through porous flame arresting pad 8 and mesh heating element 18. The heated fuel/air mixture then passes through bore 19 in lower plate 12 into the intake manifold of the engine.

FIG. 3 is an exploded view of the device illustrating the positions of the components prior to being assembled and mounted to the engine. Upper and lower gaskets 21 and 22 sandwich upper and lower plates 11 and 12 with rectangular outer wall 4 enclosing inner wall 2 which surrounds stator vane assembly 3. Immediately below stator vane assembly 3 is porous flame arresting pad 8 with mesh heating element 18 below pad 8. As indicated earlier, although inner wall 2 is illustrated as being generally circular it may take other forms such as oval, ovoid or stepped configuration.

FIG. 4 is an exploded view of stator assembly 3, inner wall 2, with porous flame arresting pad 8 and mesh heating element 18 therebelow.

FIG. 5 is an illustration of stator vane assembly 3 positioned within inner wall 2. Stator blade assembly 3 is sized such that the upper outer peripheral ends of the individual vanes will hold the vane asssembly in place until it is placed inside outer wall 4 and conducting heat from chamber 14.

Figure 6:
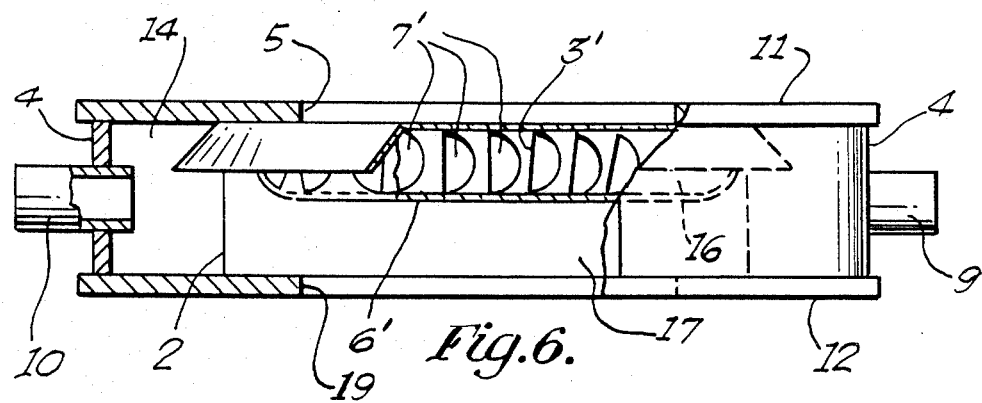
FIG. 6 is an illustration of another embodiment. (2 or 4 of these for 4 barrel carburetor).

FIG. 6 is an illustration of a unit utilizing the same principles of operation as unit in FIGS. 1-5 but with an alternate embodiment of stator blade assembly 3' with blades 7' and base 6'. A plurality of such units may be used in conjunction with a conventional four-barrel carburetor.

Figure 7:
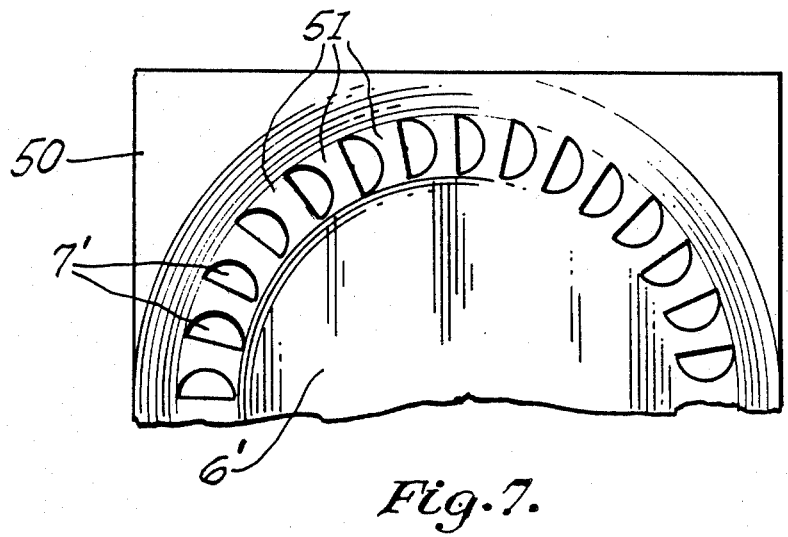
FIG. 7 is a top view of the stator vane or blade assembly shown in FIG. 6.

Referring to FIG. 7, the stator blade assembly 3', which may be upper, include blades 7' each connected to base 6' and to upper sheet portion 50. The openings are shown at 51. The upper sheet portion 50 aids in heat transfer.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An internal combustion engine having an air/fuel system including a device for improving combustion and simultaneously reducing the amount of pollutants while being released by the engine exhaust, wherein said device comprises:
    a first and second plate member separated by a generally rectangular outer wall forming a chamber;
    a second wall positioned within the confines of said first chamber to form a second chamber radially inward of the first chamber;
    each of said first and second plate members being provided with a passage permitting flow therethrough;
    stator vane assembly means for premixing said air/fuel mixture and exhaust gas means for heating said air/fuel mixture and recycling a portion of said exhaust gasses thereby improving combustion and reducing the amount of harmful pollutants being released to the atmosphere.

2. The device as set forth in claim 1 wherein said first and second plate members are further provided with aligned bolt apertures whereby the previously described components of said device are securely positioned relative to each other to permit preheating the air/fuel mixture.

3. The device set forth in claim 1, wherein said first rectangular outer wall is provided with means for admitting and releasing hot exhaust gasses relative to the first chamber.

4. The device set forth in claim 3, wherein said stator vane assembly is positioned in said second chamber and comprises a disc-like portion having upstanding circumferentially disposed vanes with passage means between adjacent vanes.

5. The device as set forth in claim 4, wherein said second wall is provided with tangentially disposed passages for directing a portion of said exhaust gasses contained in said first chamber into said second chamber to heat and intermix with said air/fuel mixture.

6. The method of improving combustion in an internal combustion engine and simultaneously reducing the amount of pollutants being released to the atmosphere comprising the steps of:
    (a) recycling a portion of the exhaust gasses produced by the engine back into the air/fuel supply;
    (b) providing a stator vane assembly for transferring heat to the air/fuel supply and also imparting a swirling motion to the air/fuel mixture;
    (c) permitting a majority of the recycled exhaust gas to come into contact with said stator vane assembly; and
    (d) directing a portion of the recycled exhaust gasses into an area where they can intermix with the air/fuel supply prior to entering the combustion chamber.

* * * * *